Aug. 4, 1953   F. R. KREEGER   2,647,757
BABY STROLLER
Filed Dec. 12, 1950

INVENTOR.
F. R. Kreeger
BY Robb & Robb
Attorneys

Patented Aug. 4, 1953

2,647,757

UNITED STATES PATENT OFFICE 2,647,757

BABY STROLLER

Frederick R. Kreeger, Shaker Heights, Ohio

Application December 12, 1950, Serial No. 200,464

3 Claims. (Cl. 280—1.22)

This invention relates to baby strollers, and more particularly to such conveyances which include therein means for providing an animated figure or the like, so as to maintain the child's attention while riding or moving about in the same.

In general, the baby stroller of this invention is of substantially conventional construction but includes therein certain means which are adapted to be actuated during movement of the vehicle or stroller so as to cause a figure carried thereby to move in response to such movement of the stroller.

It is therefore an object of this invention to disclose a baby stroller of the class described which will be simple to manufacture, and will carry out the aims and objectives hereof in a novel manner.

Having thus disclosed the general nature of my invention, the same is more specifically described in conjunction with the drawing attached hereto and in which Figure 1 is a top-plan view of a baby stroller incorporating the features of the invention therein.

Figure 1:
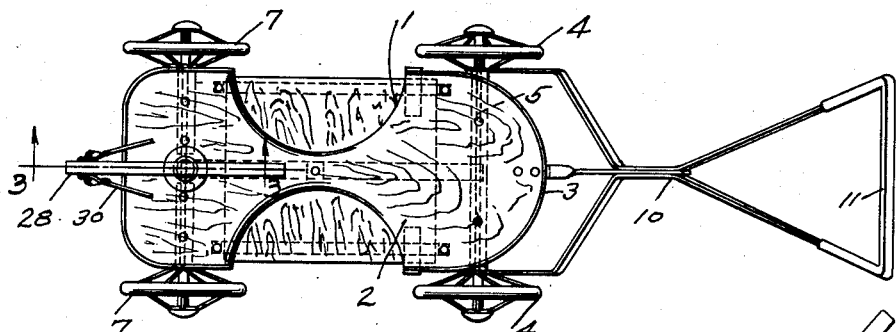
Figure 2:
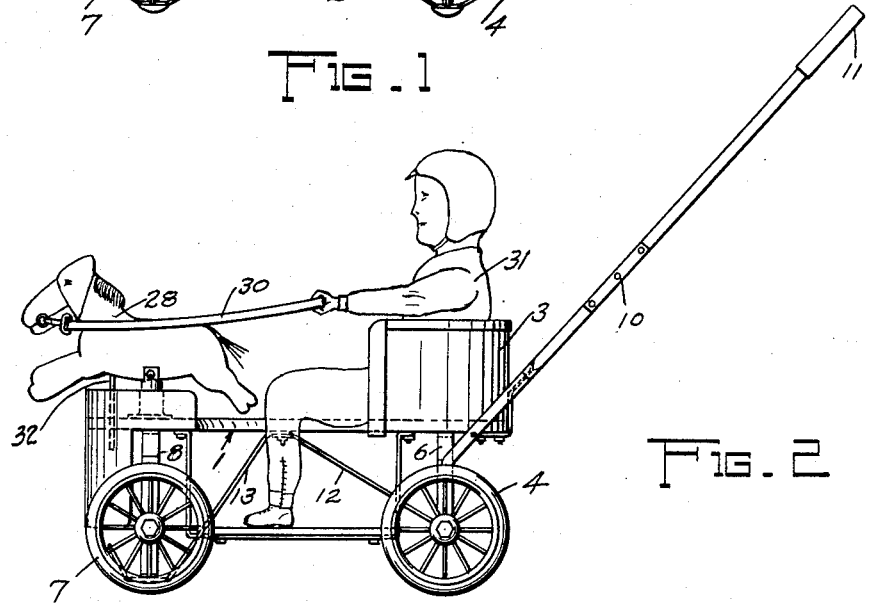
Figure 2 is a side elevation view showing the baby stroller and a child seated therein, and a figure supported on the front of the stroller for movement.

Referring now to Figures 1 and 2, I preferably construct my stroller with a seat member generally designated 1 including a saddle portion 2 thereon, the saddle portion being provided with a back rest 3. Adjacent and beneath the saddle portion 2 I provide rear wheels 4 including an axle 5 connecting the same, suitably connected to the saddle portion 2 by means of the strap members 6. The front wheels 7 are similarly connected to the seat member 1 by means of the strap member 8 secured at opposite sides of the seat member, the said wheels being connected so as to move with the axle 9 (see Figure 4).

Adjacent the rear of the stroller I provide usual handle 10 connected to the supporting members 6 and extending angularly and upwardly, terminating in a handle section 11, adapted to be grasped by the person pushing stroller.

Suitable brace members 12 and 13 are fastened adjacent the central portion of the seat member 1 and underneath the same, extending toward the rear axle and toward the front axle respectively, as to maintain the wheel and axle units in position beneath the said seat member.

The foregoing construction generally outlined is conventional and is adapted particularly for use with my invention as now to be described.

As was previously stated, the front wheels 7 are connected to the axle 9 so as to rotate therewith. Intermediate the ends of the axle 9 to which the wheels 7 are fastened a round cam or eccentric, generally designated 14, is provided suitably fastened to the axle 9 by means of the angles 15 at each side thereof. The angles 15 are connected to the round cam member 16 by means of any suitable bolts and nuts 17 and are in addition fixed to the axle by means of spot welding, as indicated at 18. It will be apparent that the rotation of the axle 9 will carry the cam member 16 therewith. The cam member 16 is provided with guide flanges 19 at opposite sides thereof, as indicated in Figure 4.

A push rod, generally designated 20 is suitably mounted in a bearing 21 fastened to the front of the seat member 1. The bearing or guide 21 is of preferably elongated construction so as to maintain the push rod 20 in position during its movement, as will be hereinafter set forth.

Figure 4:
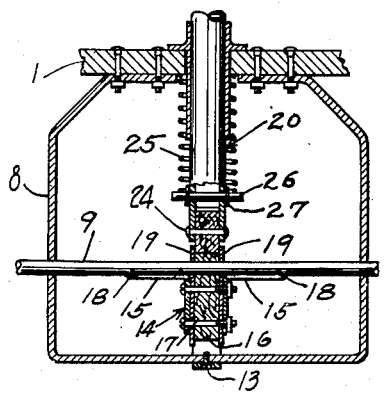
Figure 4 is a detail view somewhat fragmentary in nature, taken about on the line 4—4 of Figure 3, looking in the direction of the arrows, to show more particularly the construction of the cam arrangement of which I avail myself.
Figure 3:
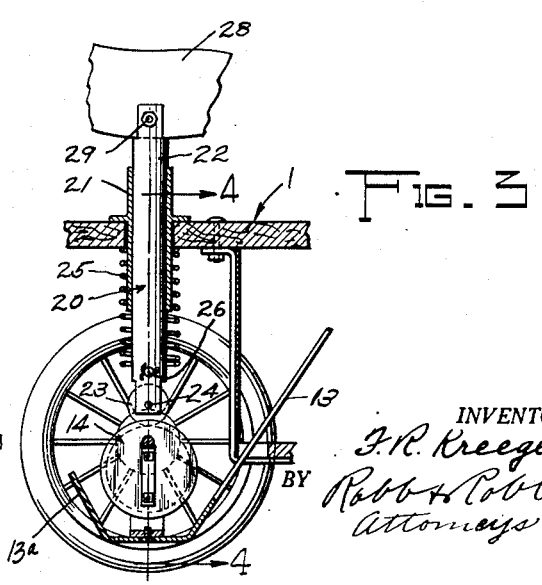
Figure 3 is a view partially in section taken about on the line 3—3 of Figure 1, looking in the direction of the arrows, to illustrate the means for moving the figure supported upon the stroller.

The push rod unit 20 may preferably comprise a hollow tube 22 and is provided with a roller 23 at the lower end thereof, mounted in a bifurcated portion as shown in Figures 3 and 4. The roller 23 is supported for rotation on a pin 24 extending through said roller and suitably fastened at opposite sides on the bifurcated portion of the push rod tube 22. The roller 23 is adapted to engage the periphery of the cam member 16 and is guided in its movement by means of the flanges 19 at opposite sides of the said cam member 16, as will be apparent. The roller 23 is maintained in contact with the periphery of the cam member 16 by means of a suitable spring 25. The spring 25 is seated at its upper end around the guide 21 and against the under side of the seat member 1. The opposite end of the spring engages a cross pin 26 mounted in position by cotter pins 27, the said cross pin 26 being of sufficient length so as to engage the coils of the spring as shown in Figure 4.

At the upper end of the push rod 22 above the guide or bearing member 21, a figure such as a horse 28 is suitably supported in a bifurcated portion of the tube and connected thereto by any suitable fastening, as indicated at 29. In the drawing, as shown in Figure 2, the figure of a horse is illustrated and suitable reins 30 are provided and adapted to be grasped by a child 31, seated in the stroller.

It will be apparent that rotation of the front wheels 7 and the cam unit 14 connected to the axle 9 will effect an up and down movement of the figure 28 so as to cause the same to rise and fall and maintain the interest of the child who is riding in the stroller. It will also be apparent that other figures may be substituted for that of the horse 28 and the movement thereof in accordance with forward movement of the stroller as a whole, will attract the child.

In view of the foregoing it will be apparent that I have described a simple and yet novel form of baby stroller which includes an animated figure therein, and novel means for effecting the animation of such figure.

It will be noted that the frame or strap member 8 which supports the front axle 9 is constructed in a novel manner to afford rigidity of the front wheel mounting and function as a guard for the axle and cam means 14. To this end the frame member 8 is secured to the seat 1 and extends downwardly therefrom, adjacent one front wheel to a point below the axle 9, thence extends transversely of the vehicle directly beneath the axle to a point adjacent the other front wheel and thence extends upwardly to a point of securement to the seat member.

The portion of frame 8 extending transversely rigidifies the upwardly extending portions through which the axle 9 extends and serves to provide a guard below the axle and cam 14 protecting the same.

The brace member 13 further rigidifies the front wheel mounting, extending downwardly and forwardly from the seat member to connection with the frame member 8 just beneath the cam 14, and thence extending upwardly and forwardly beyond the frame member to provide the guard portion 13a serving to protect the cam member.

A guide rod 32, connected to the figure 28 and extending through an aperture in the seat 1 forming a bearing for said rod, assists in maintaining longitudinal alignment of the figure 28 longitudinally of the vehicle during up and down movement of the figure 28.

Having thus described my invention, what I claim as new and desire to secure by Letters Patent of the United States is:

1. In a baby stroller of the class described, in combination, a seat member, front and rear supporting wheels connected thereto, an axle carrying a pair of the front supporting wheels and movable therewith, an elongated hollow bearing member extending through the seat member, a push rod mounted in said bearing member for upward and downward movement relative to said seat, a figure supported on the upper end of said push rod, a cam member carried by said axle, and a roller member carried at the lower end of said push rod in engagement with said cam member for causing said movement of the push rod upon rotation of said axle, an abutment member at the lower end of said push rod, and a coil spring encircling the portion of said bearing member extending below said seat member, the upper end of the spring engaging the seat and the lower end of the spring engaging said abutment to urge the push rod downwardly for maintaining engagement of the roller with said cam, and a frame member supporting said axle, said frame member being secured to said seat member and extending downwardly therefrom, adjacent one front wheel, to a point below said axle and the cam member thereon, thence extending transversely of the vehicle directly below the axle and said cam member to a point adjacent the other front wheel, and thence extending upwardly to point of securement to said seat member, and a brace member secured to the seat member intermediate the front and rear thereof midway between opposite sides thereof and extending downwardly and forwardly therefrom and secured to the transversely extending portion of said frame member midway between opposite sides thereof, and thence extending upwardly and forwardly therefrom in front of the cam member to provide a guard portion for said cam member.

2. In a baby stroller of the class described, in combination, a seat member, front and rear supporting wheels connected thereto, an axle carrying a pair of the front supporting wheels and movable therewith, an elongated hollow bearing member extending through the seat member, a push rod mounted in said bearing member for upward and downward movement relative to said seat, a figure supported on the upper end of said push rod, a cam member carried by said axle, and a roller member carried at the lower end of said push rod in engagement with said cam member for causing said movement of the push rod upon rotation of said axle, an abutment member at the lower end of said push rod, and a coil spring encircling the portion of said bearing member extending below said seat member, the upper end of the spring engaging the seat and the lower end of the spring engaging said abutment to urge the push rod downwardly for maintaining engagement of the roller with said cam and a guide rod connected to said figure and extending through an aperture in said seat for guiding the figure in its upward and downward movement.

3. In a baby stroller of the class described, in combination, a seat member, front and rear supporting wheels connected thereto, an axle carrying a pair of the front supporting wheels and movable therewith, an elongated hollow bearing member extending through the seat member, a push rod mounted in said bearing member for upward and downward movement relative to said seat, a figure supported on the upper end of said push rod, a cam member carried by said axle, and a roller member carried at the lower end of said push rod in engagement with said cam member for causing said movement of the push rod upon rotation of said axle, an abutment member at the lower end of said push rod, and a coil spring encircling the portion of said bearing member extending below said seat member, the upper end of the spring engaging the seat and the lower end of the spring engaging said abutment to urge the push rod downwardly for maintaining engagement of the roller with said cam the lower end of the push rod being provided with bifurcated portions between which the roller is rotatably mounted, said cam member being provided with guide means at opposite sides thereof, said guide means being spaced to receive the roller member therebetween whereby to prevent rotation of the tubular member in its upward and downward movement thereof.

FREDERICK R. KREECHER.

References Cited in the file of this patent

UNITED STATES PATENTS

| Number | Name | Date |
|---|---|---|
| 413,523 | Kirker | Oct. 22, 1889 |
| 1,317,952 | Bennett | Oct. 7, 1919 |
| 1,404,834 | Chapdelaine | Jan. 31, 1922 |
| 1,656,461 | White | Jan. 17, 1928 |
| 1,793,848 | Gill et al. | Feb. 24, 1931 |
| 2,404,186 | Mariani | July 16, 1946 |
| 2,509,805 | Briggs | May 30, 1950 |